United States Patent
Byrne

(10) Patent No.: US 7,341,480 B2
(45) Date of Patent: Mar. 11, 2008

(54) RELEASABLE LATCH ASSEMBLIES

(76) Inventor: Norman R. Byrne, 2736 Honey Creek NE., Ada, MI (US) 49301

( * ) Notice: Subject to any disclaimer, the term of this patent is extended or adjusted under 35 U.S.C. 154(b) by 0 days.

(21) Appl. No.: 11/597,370

(22) PCT Filed: Jun. 8, 2004

(86) PCT No.: PCT/US2004/017888

§ 371 (c)(1),
(2), (4) Date: Nov. 22, 2006

(87) PCT Pub. No.: WO2005/124936

PCT Pub. Date: Dec. 29, 2005

(65) Prior Publication Data

US 2007/0232130 A1   Oct. 4, 2007

(51) Int. Cl.
*H01R 13/60* (2006.01)
(52) U.S. Cl. ........................ 439/532; 439/138; 439/557
(58) Field of Classification Search ................ 439/138, 439/532, 557
See application file for complete search history.

(56) References Cited

U.S. PATENT DOCUMENTS

| | | | | |
|---|---|---|---|---|
| 5,259,787 A * | 11/1993 | Byrne | ........................ | 439/532 |
| 6,176,735 B1 * | 1/2001 | Kawaguchi | ................. | 439/532 |
| 6,733,334 B2 * | 5/2004 | Chen | ........................... | 439/554 |
| 7,118,412 B2 * | 10/2006 | Lim | ............................ | 439/532 |
| 7,238,882 B2 * | 7/2007 | Perkins et al. | ................. | 174/66 |

* cited by examiner

*Primary Examiner*—Truc Nguyen
(74) *Attorney, Agent, or Firm*—Varnum, Riddering, Schmidt & Howlett LLP

(57) ABSTRACT

A latching device (200) is disclosed for use in supporting a junction block (202) on a supporting bracket (204). The latching device (200) includes a horizontal support (230) coupled to a hinge (232). A first cantilever beam (234) is coupled to the hinge and to a ledge structure (240). The ledge structure (240) includes upper and lower ledges (242, 244). The supporting bracket is adapted to releasably engage either said upper ledge (242) or said lower ledge (244), dependent upon the desired position of the junction block (202) relative to the supporting bracket (204).

24 Claims, 8 Drawing Sheets

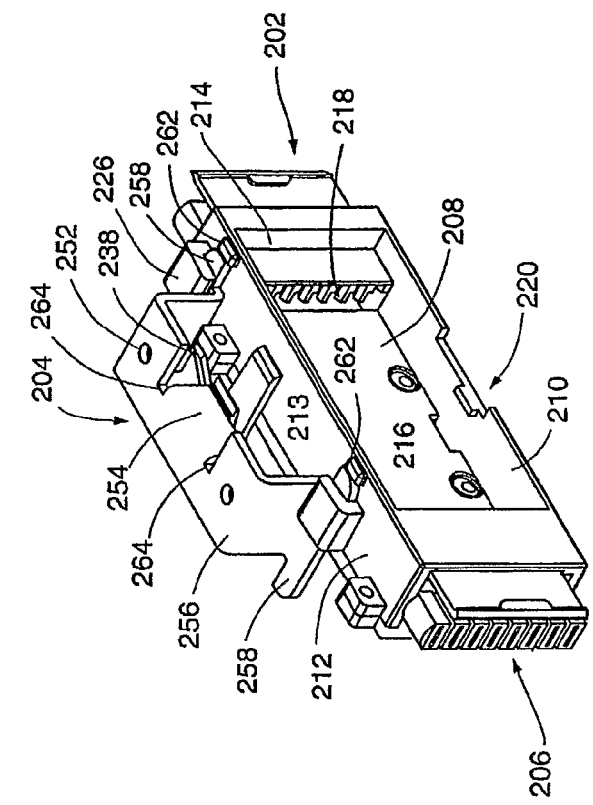
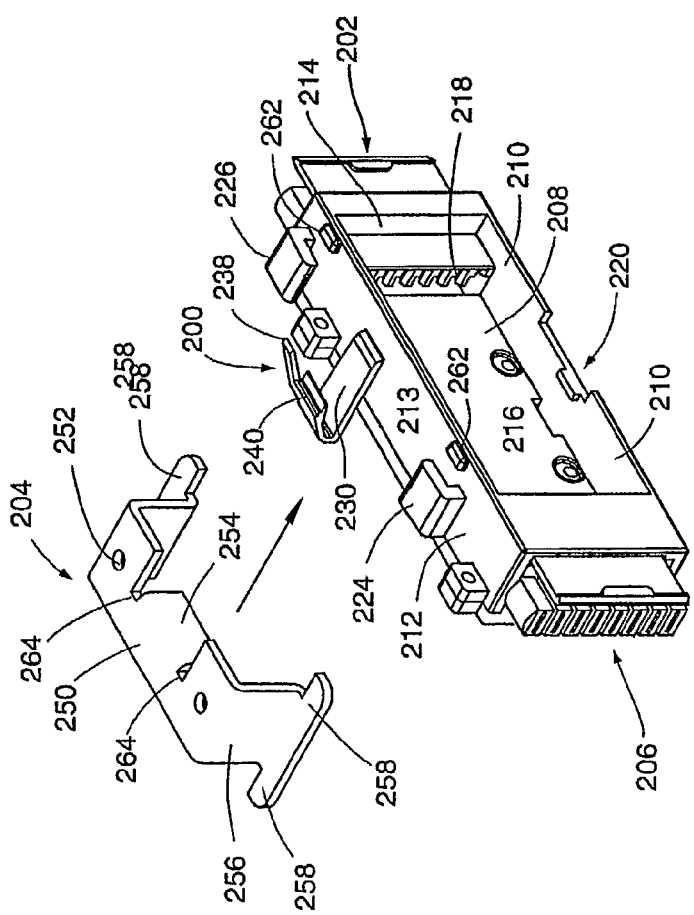

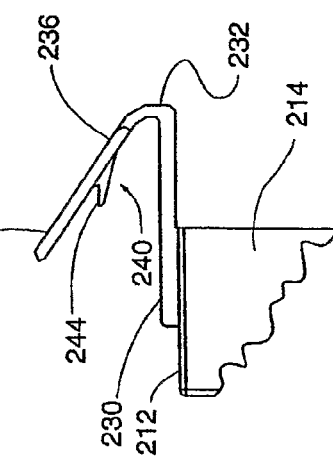
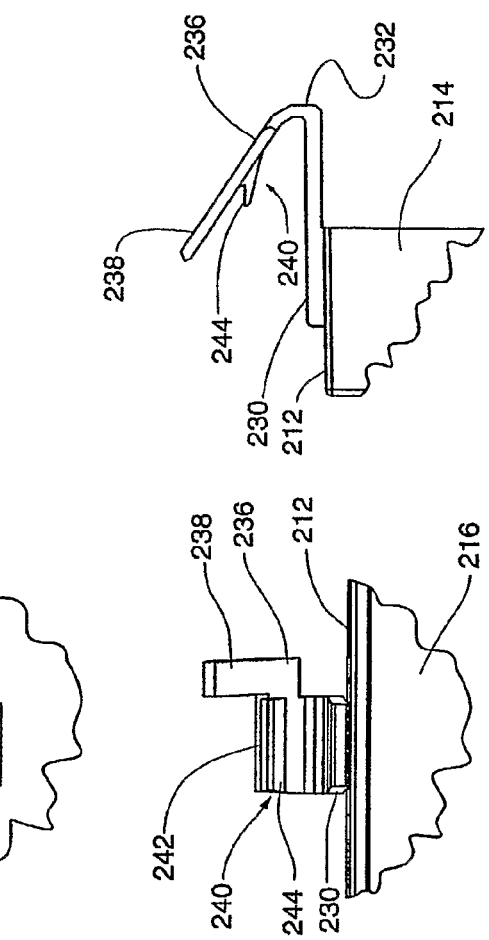
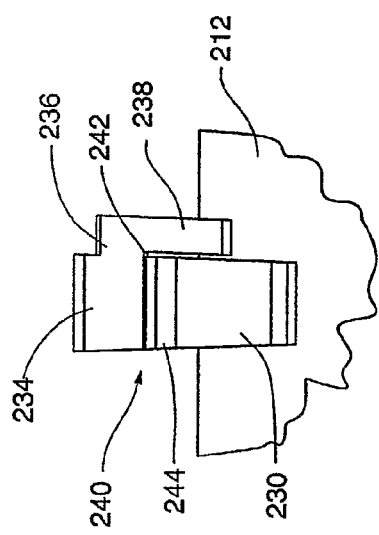
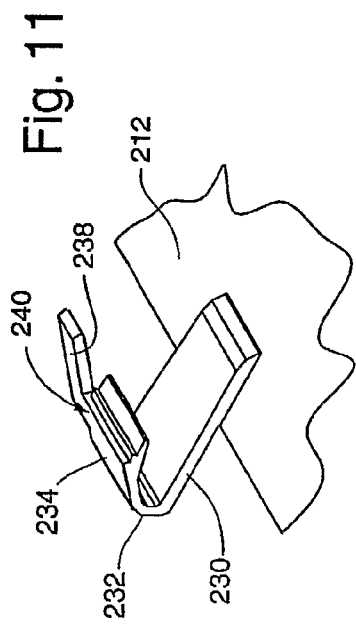
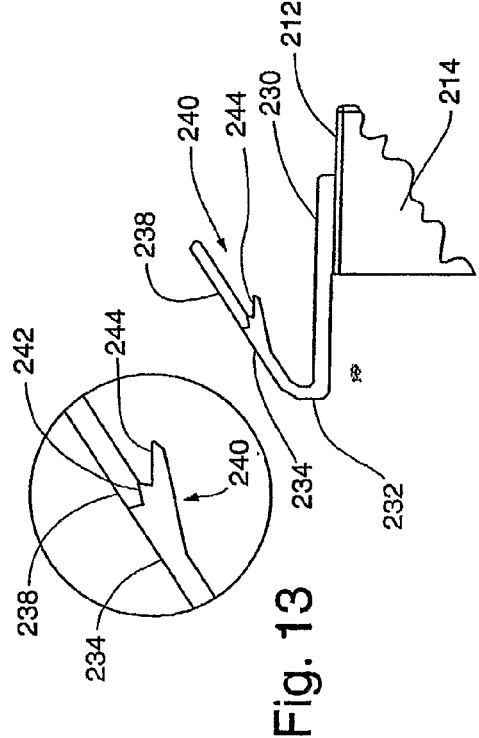

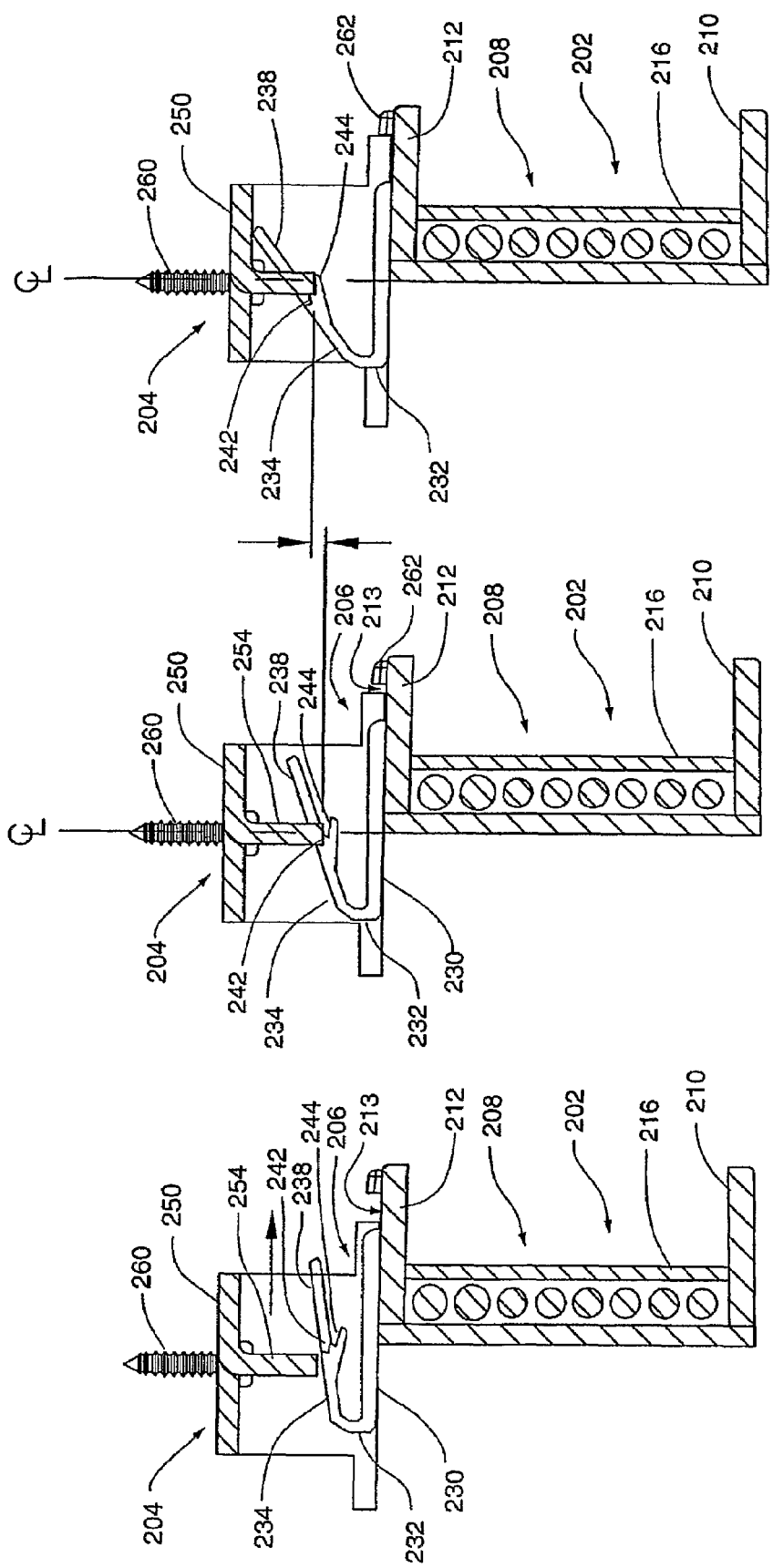

RELEASABLE LATCH ASSEMBLIES

CLAIM OF PRIORITY

Not applicable.

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The invention relates to apparatus for mounting electrical junction blocks and the like and, more particularly, to an arrangement for mounting such devices in confined areas such as electrical raceways.

2. Description of Related Art

Modern office arrangements often employ removable wall panels or the like to define work areas. Such panels and other structures often have a raceway area for accommodating electrical wiring and electrical junction blocks near the floor or in other locations which do not provide easy access to technicians. Typically, junction blocks are mounted within such raceway areas by attaching them to support brackets. Since the electrical wiring requirements and locations of the junction blocks, some of which may include outlet boxes and the like, depend on the ever-changing needs of the users, junction blocks are often installed or removed after the wall panel structures are in place. Installing or removing a junction block positioned, for example, near the bottom of a wall panel and essentially at floor level, is often an arduous task.

One problem which exists with respect to the use of junction blocks is that they need to be typically supported within the raceway area through other supporting structures. Also, although it is advantageous to manufacture and require junction blocks having relatively standard dimension sizes, raceway areas may vary in dimensions. For example, although the raceways may extend the length of a wall panel or the like, the corresponding width of the raceway may vary from panel to panel, and from manufacturer to manufacturer. It is difficult if the manufacturer and installer of junction blocks in these raceways must construct and acquire junction blocks of differing dimensions, dependent upon the particular widths of the raceways into which the junction blocks are to be installed. Accordingly, it would be advantageous for the junction blocks to have means for accommodating raceway areas of varying widths.

In addition to the foregoing, another problem which exists with respect to interconnection of junction blocks to raceways is that it is preferable if the junction block can be manually removed from the raceway or structural member supporting the junction block in the raceway, without requiring any complex tools, other than a screwdriver blade or the like. Further, if the junction block is assembled into a raceway of a wall panel from one side of the wall panel, it is preferable if the junction block can be removed from the same side of the wall panel, without requiring any manual activities to be undertaken from the other side of the wall panel. This is particularly important in situations where the wall panels are being utilized in relatively cramped areas. The following paragraphs describe various prior art systems associated with latching mechanisms.

U.S. Pat. No. 4,993,576, issued Feb. 19, 1991 to the inventor of the present invention, shows a junction block provided with a latching mechanism comprising a pair of opposing interlocking members hingedly attached to a junction block and arranged to define a channel between opposing edges for engaging a retainer tab. A similar device is disclosed in U.S. Pat. No. 5,051,203 issued May 14, 1991 to Furrow. Junction blocks are typically constructed by adjoining two complementary, separately molded, half sections. The latching arrangement typically has one of the engaging sections molded as an integral part of one half section and the opposing part molded as an integral part of the other half section. The prior art latches comprise opposing and interlocking tongues and grooves. Unless special precautions are taken in the manufacture of these parts, the opposing sections may not be properly aligned, resulting in improper operation of the latch arrangements. A further disadvantage of such prior art arrangements is that a grooved section defined between the opposing edges tends to be reduced in size when the interlocking members are depressed, potentially causing a binding of the tab retained between the opposing edges of the interlocking members.

U.S. Pat. No. 5,259,787, issued Nov. 9, 1993 to the inventor of the present invention, and which is incorporated by reference herein, shows a junction block latching mechanism comprising a latch arm constructed as a cantilever beam. The cantilever beam extends from an outer wall of the junction block and is provided with a transversely extending channel for engagement with a retaining tab attached to a structural member designed to receive the junction block. A shortcoming of a latching mechanism employing such a cantilever beam construction is that it may be difficult to insert the junction block from one side of the frame due to the fact that the free end of the cantilever beam latch is raised to a position such that its ends abut against the tab, thereby preventing an easy installation.

SUMMARY OF THE INVENTION

These and other problems with the prior art are overcome in accordance with this invention through a releasable latching mechanism adapted for use with an electrical junction block for supplying power to at least one outlet receptacle from incoming power transmitted through the junction block to the receptacle. The latching mechanism is adapted to releasably support the junction block on a supporting bracket. The latching mechanism includes support means for securing the latching mechanism to the junction block. A ledge structure is coupled to the support means and comprises at least first and second ledges. The supporting bracket releasably engages the first ledge when the junction block is in a first position relative to the supporting bracket. Correspondingly, the supporting bracket releasably engages the second ledge when the junction block is in a second position relative to the bracket. When the bracket releasably engages either the first ledge or the second ledge, the junction block is prevented from being moved in a first direction away from the supporting bracket, in the absence of manipulation of the latching mechanism.

With the configuration of the latching mechanism, junction block and supporting bracket, manual forces may be exerted on the latching mechanism, for purposes of disengaging the junction block from the supporting bracket. However, in accordance with the invention, these forces may be exerted on the junction block from the same side of the supporting bracket as the junction block was received with the supporting bracket. Accordingly, it is unnecessary for any forces to be exerted on the latching mechanism from an opposing side of the supporting bracket, for purposes of releasing the junction block from the supporting bracket.

The latching mechanism also includes resilient means coupled to the supporting bracket and to the ledge structure for permitting, in response to manual manipulation, the ledge structure to flex so as to allow the first ledge to be disengaged from the supporting bracket. Still further, the junction block may then be pulled away from the supporting bracket. In addition, the resilient means permits, in response to manual manipulation, the ledge structure to deflect so as to allow the second ledge to be disengaged from the supporting bracket, and to allow the junction block to then be pulled away from the supporting bracket. The resilient means comprises hinge means having resilient properties and having one edge coupled to the support means. Still further, the resilient means includes a first cantilever beam having one end coupled to the hinge means, and the other end coupled to the ledge structure.

The latching mechanism also includes means for preventing any substantial lateral movement of the junction block relative to the supporting bracket, when the supporting bracket is releasably engaged with either the first ledge or the second ledge. The means for preventing any substantial lateral movement of the junction block relative to the supporting bracket includes a second cantilever beam coupled to the support means, and adapted to flex upwardly and downwardly relative to the junction block.

In accordance with other aspects of the invention, the junction block includes an upper surface of an upper wall. The support means includes a horizontally positioned member rigidly secured to the upper surface of the upper wall. A pair of mounting lugs are secured to the upper surface. The support means is positioned on the upper surface between the mounting lugs, and the support means is further positioned nearer one of the mounting lugs relative to the other of the mounting lugs.

The supporting bracket can include a downwardly extending flange. The bracket releasably engages a first ledge when the downwardly extending flange is releasably engaged with the first ledge. Correspondingly, the supporting bracket releasably engages the second ledge when the flange is releasably engaged with the second ledge. The supporting bracket can include a series of mounting brackets. When the supporting bracket is releasably engaged with either the first ledge or the second ledge, each one of a pair of the mounting brackets is releasably received within a corresponding one of the mounting lugs.

The latching mechanism can include a living hinge having resilient properties and coupled to the support means. The first cantilever beam can have one end coupled to the hinge means and an opposing end coupled to the ledge structure. The second cantilever beam can be coupled to the first cantilever beam and positioned to the side thereof. The first cantilever beam extends in substantially the same plane as the second cantilever beam.

Still further, the supporting bracket can include a pair of openings formed on each side of the downwardly extending flange. The supporting bracket and the second cantilever beam are sized and configured so that when the downwardly extending flange engages either the first ledge or the second ledge, the second cantilever beam extends into one of the openings of the supporting bracket. In addition, the junction block includes stop means for preventing the junction block from moving too far in one direction relative to the supporting bracket.

In accordance with a further aspect of the invention, a junction block and latching mechanism assembly is provided, with a pair of junction blocks. A pair of releasable latching mechanisms is provided, with each of the mechanisms being coupled to a different one of the junction blocks. A supporting bracket is adapted to releasably support both of the junction blocks. Each of the releasable latching mechanisms has a ledge structure comprising at least first and second ledges. The supporting bracket engages either the first ledge or the second ledge of both of the junction blocks, when each of the junction blocks is in a first position or a second position, respectively, relative to the supporting bracket. When the supporting bracket releasably engages either the first ledge or the second ledge of both of the junction blocks, both junction blocks are prevented, in the absence of manual manipulation of the latching mechanisms, for being moved outwardly away from the supporting bracket. The latching mechanisms and the supporting bracket are sized and configured so that the pair of junction blocks can be supported on the supporting bracket in a back to back relationship, without requiring more than one supporting bracket. Also, the junction blocks can be supported in the back to back relationship in an offset configuration.

BRIEF DESCRIPTION OF THE DRAWING

Illustrative embodiments of the invention are described in the following paragraphs with reference to the drawing, in which:

FIG. 7 is an exploded view of the junction block and latching device shown in FIG. 6, and showing the relative positioning of the junction block with a supporting racket which may be associated with a raceway area, as the junction block is installed onto the supporting bracket;

FIG. 8 is a perspective view of the junction block and supporting bracket shown in FIG. 7, in a fully assembled state;

FIG. 11 is a fragmentary, perspective view of the latching device of the junction blocks shown in FIG. 6, in accordance with the invention;

FIG. 12 is a fragmentary, plan view of the latching device shown in FIG. 11;

FIG. 13 is a still further fragmentary view of the supporting ledges of the latching device shown in FIG. 11;

FIG. 14 is a fragmentary, elevation view of the latching device shown in FIG. 11;

FIG. 15 is a fragmentary, front elevation view of the latching device shown in FIG. 11;

FIG. 16 is a fragmentary, right-side elevation view of the latching device shown in FIG. 11;

FIG. 17 is a sectional view showing the relative positioning of the junction block and supporting bracket, as the junction block is moved into a desired position for assembly with the supporting bracket;

FIG. 18 illustrates a sectional view of a fully assembled junction block and supporting bracket in accordance with the invention, for a particular width of raceway area; and FIG. 19 is a view similar to FIG. 18, illustrating the junction block and the supporting bracket in a fully assembled configuration, for a differing width of raceway area.

DESCRIPTION OF THE PREFERRED EMBODIMENT

The principles of the invention are disclosed, by way of example, in a latching device 200 or mechanism associated with a junction block 202, as described in subsequent paragraphs herein and illustrated in FIGS. 6-19. The latching device 200 provides a means for accommodating raceway areas of differing widths, without requiring junction blocks having varying sizes. In addition, the latching device 200 provides a means for permitting manual manipulation of the junction block relative to a raceway, particularly with respect to removal of the junction block from one side of the raceway. For purposes of complete description, FIGS. 1-5 illustrate a prior art latching device utilized in a mounting assembly with a dual entry cantilever latch. This prior art configuration is disclosed in Byrne, U.S. Pat. No. 6,343,947 issued Feb. 5, 2002. The disclosure of the patent is incorporated by reference herein. The following paragraphs first discuss this prior art assembly.

Figure 1:
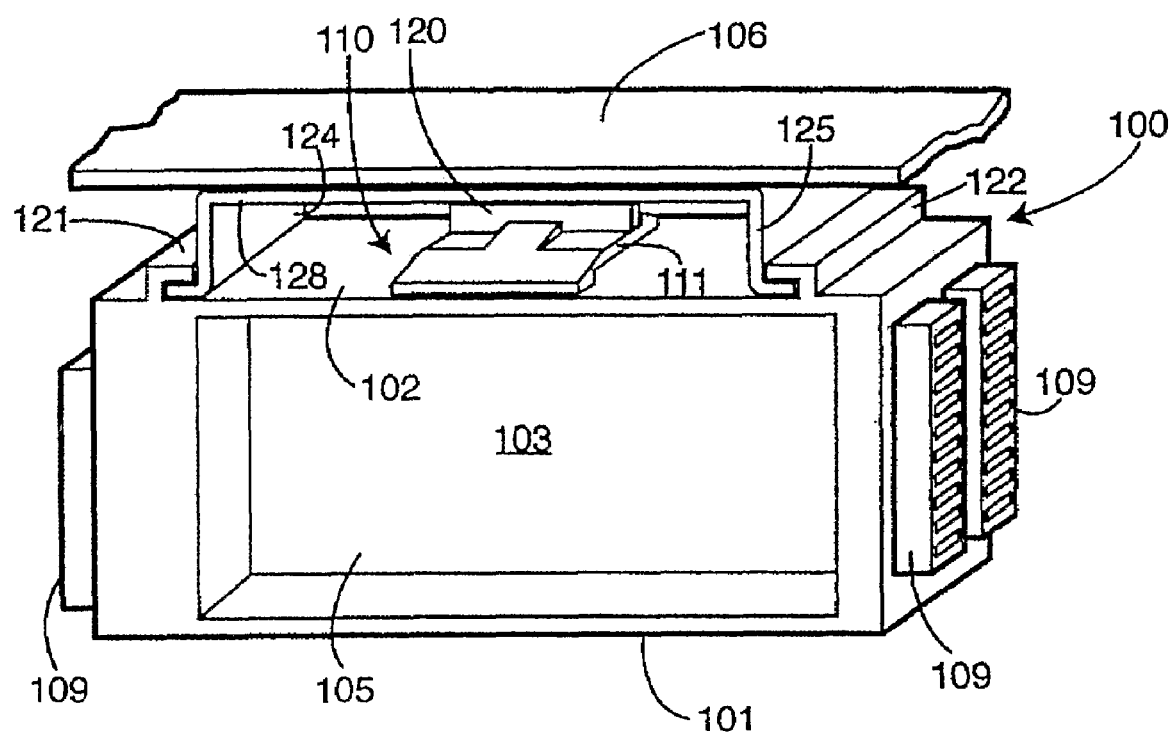
FIG. 1 is a perspective view of a prior art junction block mounted on one type of support structure.

FIG. 1 shows an electrical junction block housing 100 (sometimes referred to herein as the "junction block") supported on a structural member 106 by means of L-shaped mounting lugs 121, 122 on the housing 100. The lugs 121, 122 engage cooperating L-shaped brackets 124, 125 attached to the structural member 106. The structural member 106 may, for example, be the upper wall of a raceway in a wall panel or the like. The junction block housing 100 is provided with a substantially horizontally-extending lower wall 101 and a substantially parallel upper wall 102. A vertical wall 103 extending between the lower wall 101 and the upper wall 102 serves to divide a spatial area 105 from a similar area on the opposite side of wall 103. The spatial areas 105 are typically used to accommodate electrical outlet boxes or the like in the junction block housing. The junction block housing 100 may be connected to electrical circuits by means of electrical connectors 109 in a standard fashion. The junction block housing 100 is maintained in position relative to the structural member 106 by a retaining or "retainer" tab 120 mounted on the structural member 106 and engaging a latching device 110 disposed between mounting lugs 121, 122 on the upper wall 102 of the housing 100. The L-shaped brackets 124, 125 and the tab 120 may be formed with a plate 128 attached to the structural member 106.

Figure 2:
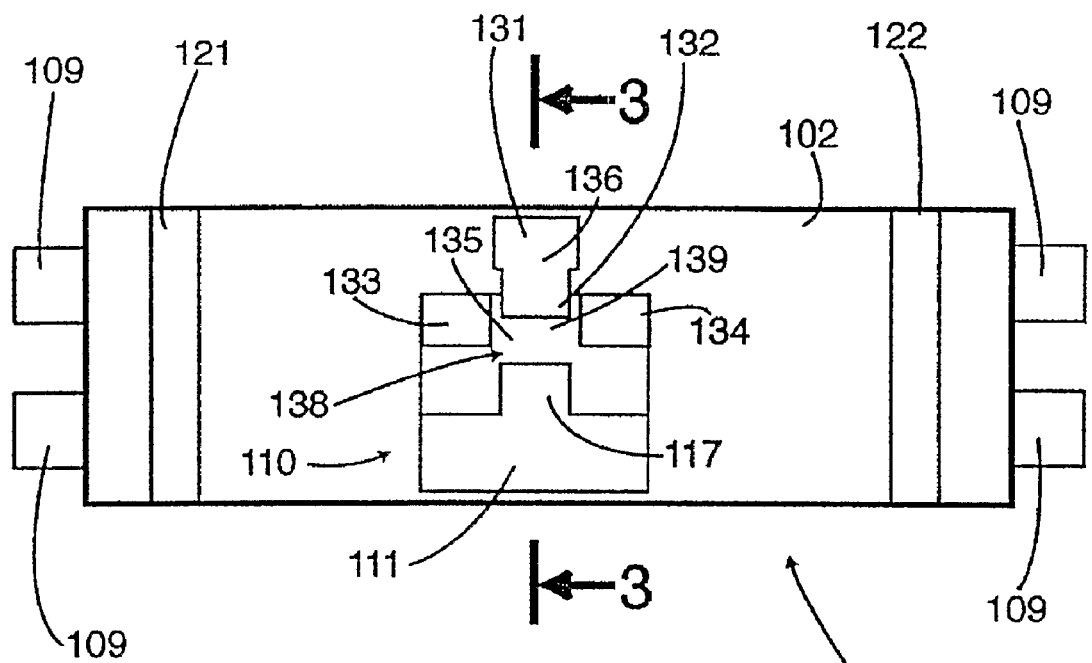
FIG. 2 is a top plan view of a prior art junction block incorporating a latching mechanism.
Figure 3:
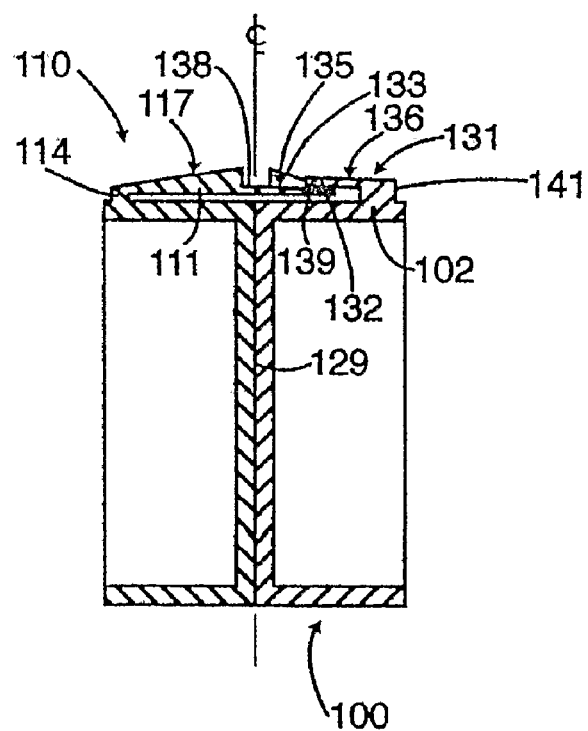
FIG. 3 is a cross-sectional view taken along lines 3-3 of FIG. 2.

FIG. 2 is a top plan view of the junction block housing 100 removed from the structural member 106, the plate 128 and the retaining tab 120. The latching device 110 is shown as comprising a first cantilever beam 111 and a second retention beam 131 having an end portion 132 overlapping a portion of the first cantilever beam 111. FIG. 3 is a cross-sectional view of the latch mechanism of FIG. 2, taken along line 3-3. As depicted in the drawing, the first cantilever beam 111 extends from adjacent one side of the housing 100, and has one end attached to a hinged section or "hinge" 114. The first cantilever beam 111 extends toward and past a centerline 129 of the housing 100 and is provided with a first upwardly sloping surface 117, sloping upwardly from the hinge section 114 toward the centerline 129. Second and third raised portions 133 and 134 (only the second raised portion 133 is shown in FIG. 3) slope downwardly from the centerline 129 toward the opposite side of housing 100. A tab channel 138, as shown primarily in FIGS. 2 and 3, is formed between the second and third raised portions 133, 134, and the sloping surface 117 of the first cantilever beam 111. The second retention beam 131 is provided with the end portion 132 overlapping a relatively flat center portion 135 of the first cantilever beam 111, extending between the raised portions 133, 134 of first cantilever beam 111. The end portion 132 of the second retention beam 131 is connected to the upper wall 102 through an interconnection section 141, as depicted in FIG. 3. Although the interconnection section 141 may be characterized as somewhat of a "hinge," the second retention beam 131 is not required to be particularly resilient or otherwise "flexible" in movement, relative to the upper wall 102. The second retention beam 131 primarily serves so as to maintain the first cantilever beam 111 in a position which allows for insertion of the junction block housing 100 in a direction from the left hand side to the right hand side as viewed in FIG. 3, relative to positioning of the junction block housing 100 with the retainer tab 120. The second retention beam 131 includes a surface 136, as shown primarily in FIGS. 2 and 3. The surface 136 is positioned in a substantially horizontal plane, and may or may not have somewhat of an upwardly sloping surface, with the slope extending upwardly from the interconnection section 139 toward the centerline 129. The relatively flat center portion 135 of the first cantilever beam 111 terminates in an end portion 139 which extends toward and below the end portion 132 of the second retention beam 131. In fact, the end portion 132 of the second retention beam 131 is exerting downward pressure on the first cantilever beam 111, thereby limiting upward movement of the beam 111. That is, in the configuration shown in FIG. 3, the first cantilever beam 111 will essentially be in a "tensioned" state, such that the first cantilever beam 111 would tend to rotate in a counter clockwise direction (as viewed in FIG. 3) relative to its hinge section 114 if the second retention beam 131 was absent.

As will be apparent from FIGS. 1 through 3, when the housing 100 is inserted from the front side, as depicted in FIG. 1, the tab 120 will first move above the substantially horizontal surface 136 of the second retention beam 131. As previously mentioned, the end portion 132 of the second retention beam 131 is exerting a downward pressure on the free end of the first cantilever beam 111 at the center portion 135 of the first cantilever beam 111. In this manner, the first cantilever beam 111 is being prohibited from any upward movement of the end portion 139, in a manner whereby the end portion 139 would contact the retainer tab 120, thereby preventing any further movement of the junction block housing 100. As the junction block 100 continues to be inserted, the sloping sections 133 and 134 of the first beam 111 will properly engage the retaining tab 120, thereby depressing the first cantilever beam 111. Further movement of the junction block 100 toward retaining tab 120 will result in further depression or downward movement of the first beam 111, in view of the angled or sloping configurations of the sloping sections 133 and 134. When the tab channel 138 formed between the sloping section 117 on the one side and sloping sections 133 and 134 on the other side of the first cantilever beam 111 is in alignment with the retaining tab 120, the resilient first cantilever beam 111 will tend to return to its prior position and the free end of tab 120 will be retained in the tab channel 138. That is, the first cantilever beam 111 will tend to pivot in a counter clockwise direction (as viewed in FIG. 3) about the hinged section 114. This pivotal movement will continue until the flat center portion 135 of the first cantilever beam 111 again engages the substantially horizontal surface 136 of the second retention beam 131. The relative configuration of the first cantilever beam 111 and the second retention beam 131 is such that in this position, the retaining tab 120 is retained in the tab channel 138. The foregoing is a description of the manner in which the junction block housing 100 could be inserted from the front side, as depicted in FIG. 1. This insertion will correspond to insertion of the housing 100 from the left side toward the centerline 129 as viewed in FIG. 3.

When the housing 100 is to be inserted from the opposite side (i.e., from the backside as depicted in FIG. 1, corresponding to insertion from the right side of the center line 129 as viewed in FIG. 3) such that the sloping surface 117 first engages the retaining tab 120, the first cantilever beam 111 will be increasingly depressed as the tab 120 engages the sloping surface 117, until the tab channel 138 is reached. When the tab channel 138 is reached, the first cantilever beam 111 will tend to return to its prior position, and the free end of tab 120 will be retained within the tab channel 138. Although the first cantilever beam 111 returns to its prior position, it is limited from any further upwardly movement by the second retention beam 131. In accordance with all of the foregoing, the latching device 110 provides for a retaining configuration which allows insertion of the junction block housing 100 from either direction, relative to the centerline 129. In particular, the use of the second retention beam 131 allows for insertion of the junction block housing 100 from the front side (as depicted in FIG. 1), without problems associated with the end portion 139 of the first cantilever beam 111 inappropriately abutting the retaining tab 120 during insertion.

For purposes of removing the housing 100, this removal can be undertaken from either of the two opposing sides of the support 106 and centerline 129. In either situation for removal, the removal is initiated by depressing or otherwise exerting downward pressure on the first cantilever beam 111. For example, if it is desired to remove the housing 100 from the front side, as depicted in FIG. 1 (corresponding to the left side as viewed in FIG. 3), the housing 100 may be removed by depressing the first cantilever beam 111 by any suitable device (such as a screwdriver or the like) by exerting pressure, for example, on the sloping surface 117. With pressure exerted on the sloping surface 117, the first cantilever beam 111 will be moved downwardly or otherwise depressed, in such a manner that the sloping sections 133 and 134 will be depressed below the bottom of the retaining tab 120, thereby allowing for the junction block housing 100 to be moved toward the left side, as viewed in FIG. 3.

If it is desired to remove the junction block housing 100 from the right side as viewed in FIG. 3 (e.g. from the backside as depicted in FIG. 1), the user will still initiate removal by depression of the first cantilever beam 111 by any suitable device, such as a screwdriver. For example, the user could exert pressure on either of the sloping sections 133 or 134. This downwardly exerted pressure will correspondingly depress the first cantilever beam 111. Depression of the first cantilever beam 111 will allow the uppermost edge of the sloping surface 117 to be positioned below the bottom of the retaining tab 120. In this manner, the junction block housing 100 may then be moved toward the right of the centerline 129 as viewed in FIG. 3. In accordance with the foregoing, the junction block housing 100, with the latch arrangement as described herein, is not only insertable from either of the two opposing sides of the support 106, but is also removable from either of the two opposing sides of the support 106.

Figure 4:
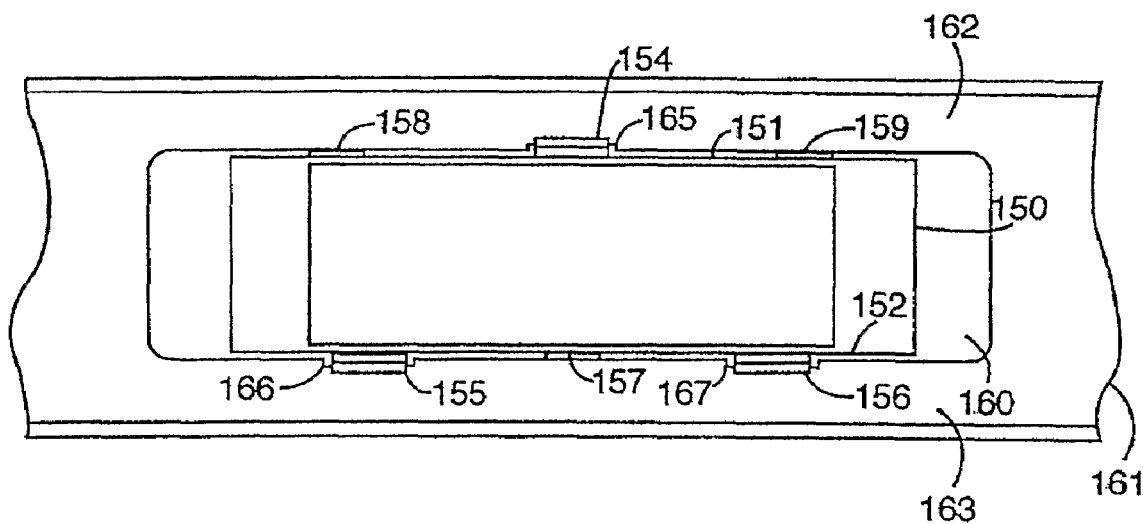
FIG. 4 is a side view of a junction block provided with a prior art latching mechanism mounted on another type of junction block support structure.

FIG. 4 is a side view of a junction block 150 mounted within an opening 160 within a frame or structural member 161. The junction block 150 is provided with an upper wall 151 and a lower wall 152. Mounted on the upper wall is a latch member 154 such as previously described herein with reference to FIGS. 1 through 3. The latch member 154 is positioned for engagement with an upper rail 162 of the structural member 161. Further latching members 155 and 156 are mounted on the lower wall 152 and are positioned for engagement with a lower rail 163 of the structural member 161. The upper rail 162, in this particular example, is provided with a detent 165 in the area where the latching member 154 engages the upper rail. Similarly, the lower rail 163 is provided with detents 166 and 167 in the vicinity of latching members 155 and 156, respectively. One or more of these detents may be conveniently provided to prevent lateral movement of the junction block. A pair of spacing shoulders 158, 159, may be provided on upper wall 151 to reduce movement of the junction block and to better secure the junction block between the upper and lower rails 162, 163. A similar shoulder 157 may be provided on the lower wall 152.

Figure 5:
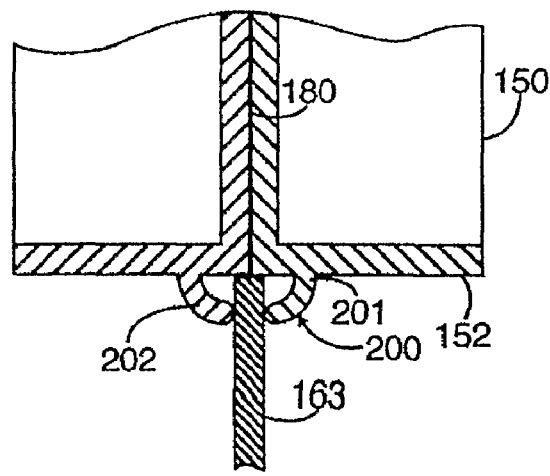
FIG. 5 is a prior art partial cross-sectional view of a lower part of the junction block of FIG. 4, provided with a lower tab for engagement with a lower rail depicted in FIG. 4.

Alternatively, one of the walls 151, 152 may be provided with one or more engagement tabs, such as tab 200 shown in FIG. 5, such that one or more of the latch members as depicted in FIGS. 1 through 3 would be formed on only the other of the walls 151, 152. As an example, FIG. 5 shows a cross-sectional view of an alternate embodiment employing an engagement tab 200 on one of the walls of the junction block 150 generally depicted in FIG. 4. By way of example, the junction block 150 may be provided with a latch member 154 on its upper wall 151 and a tab 200 on its lower wall 152. The tab 200 is provided with a pair of arcuate arms 201, 202 which are spaced apart to allow tab 200 to extend over a portion of the lower rail 163. In this manner, tab 200 serves to retain block 150 in proper position relative to lower rail 163 while allowing a pivoting of block 150 during insertion and removal. One or more spacing shoulders, such as shoulders 158, 159, may be used on the upper wall 151 of housing, a spacing shoulder on the lower surface 152, such as shoulder 157 shown in FIG. 4, will generally not be used with tab 200.

Figure 6:
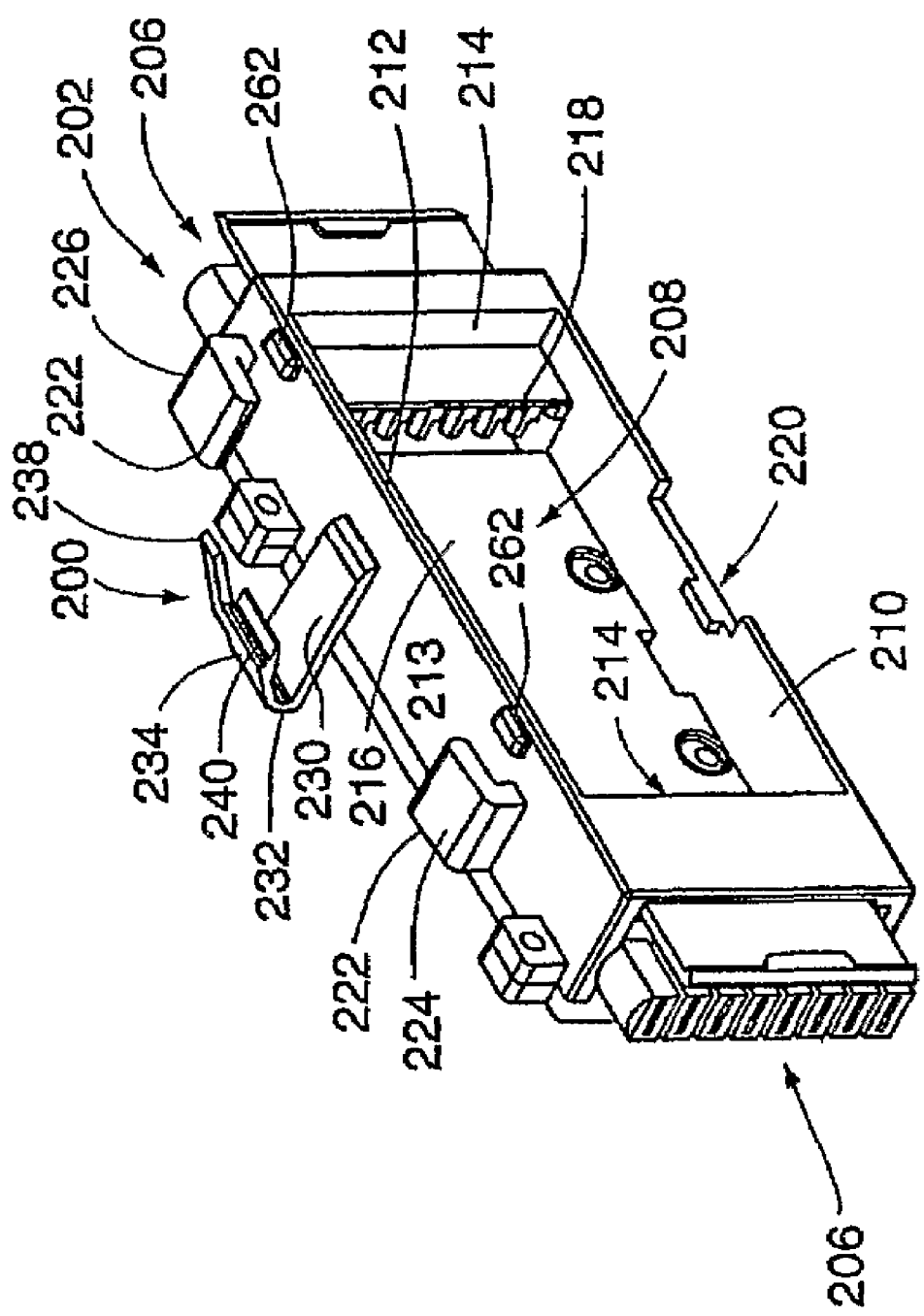
FIG. 6 is a perspective view of a junction block having a latching device in accordance with the invention.

Turning back to the invention, and as earlier stated, the principles of the invention are disclosed in a latching device 200, as described herein with respect to FIGS. 6-19. With reference specifically to FIG. 6, the latching device 200 is illustrated as being mounted on a junction block 202. The junction block 202 is a relatively well known device, and is utilized to connect incoming electrical power to electrical receptacles (not shown) within conventional electrical receptacle blocks (not shown). The junction block 202 has a configuration as illustrated in FIG. 6, and includes, at opposing ends, female external connector blocks 206. The female external connector blocks 206 comprise a series of female connectors adapted to interconnect to cable or conduit assemblies (not shown) for purposes of receiving conventional electrical power, and for transmitting conventional electrical power from one of the interconnected cable assemblies to the other interconnected cable assembly. The concept of a junction block has been previously disclosed herein, and concepts associated with junction blocks, cable assemblies and connectors is disclosed in Byrne, U.S. Pat. No. 5,096,434 issued Mar. 17, 1992. The disclosure of the Byrne patent is incorporated by reference herein. The Byrne patent also discloses concepts associated with electrical receptacle blocks and electrical receptacles therein.

The particular junction block 202 illustrated in FIG. 6 is characterized as a "single-sided" junction block, and includes a recessed area 208 projecting outwardly therefrom. The recessed area 208 is formed by a lower wall 210, upper wall 212, opposing side walls 214 and a back wall 216. Mounted to the side of the recessed area 208 adjacent a side wall 214 is a receptacle block connector 218. The receptacle block connector 218 is relatively well known and includes a series of female connectors for electrically interconnecting to an electrical receptacle block (not shown). The female connectors of the receptacle block connector 218 are connected to corresponding terminals of the female external connector blocks 206. The connections can occur through the use of various types of connector bars and wires. Such electrical connectors are further disclosed in Byrne, U.S. Pat. No. 5,096,434 issued Mar. 17, 1992 and incorporated by reference herein.

Turning to other areas of the junction block 202, the junction block 202 includes, on the lower wall 210 of the recessed area 208, a latch mechanism 220. The latch mechanism 220 does not form any of the novel concepts of the invention. The latch mechanism 220 is utilized for purposes of releasably securing an electrical receptacle block (not shown) within the recessed area 208 and is electrically engaged with the receptacle block connector 218. Such a latching configuration is described and illustrated in Byrne, U.S. Pat. No. 5,096,434 issued Mar. 17, 1992.

The junction block 202 also includes a pair of L-shaped mounting lugs 222 positioned on an upper surface 213 of the upper wall 212. The L-shaped mounting lugs 222 include a first lug 224 and a second lug 226. As shown in FIG. 6, and as one type of alternative embodiment, the mounting lugs 222 are offset from the middle of the elongated length of the junction block 202. That is, for example, the second lug 226 can be characterized as being a first distance from its end of the junction block 202. However, the first lug 224 is a relatively greater distance from its end of the junction block 202. As will be apparent from FIGS. 9 and 10, this offset of the lugs 222 provides for the corresponding offset of opposing and adjacent junction blocks 302 when assembled within a raceway area.

FIG. 6 further shows the latching device 200 in accordance with the invention. The latching device 200 is shown in greater detail in FIGS. 11-16. With reference thereto, the latching device 200 includes a lower horizontal support 230. The support 230 may be relatively rigid in structure and either connected to or integral with the upper surface of the upper wall 212. The horizontal support 230 extends backwardly from the junction block 202 and extends outwardly from the back of the block 202. The back end of the horizontal support 230 is integral with or otherwise attached to a hinged section or "hinge" 232. The hinge 232, as primarily shown in FIGS. 11, 14 and 16, has somewhat of an arcuate configuration. Preferably, the hinge 232 is relatively flexible and resilient. Extending from the upper portion of the hinge 232 and integral therewith is a first cantilever beam 234. The cantilever beam 234 has somewhat of a rectangular configuration, and is primarily shown in FIG. 12. The cantilever beam 234 extends upwardly and is angled back toward the front of the junction block 202 from the hinge 232. As further shown in FIG. 12, extending outwardly from one side of the first cantilever beam 234 and integral therewith, is a right-angled section 236. The right-angled section 236 is substantially planar and is formed on the same plane as the first cantilever beam 234. The right angled section 236 is integral with a second cantilever beam 238. The second cantilever beam 238, as primarily shown in FIG. 12, extends upwardly and toward the front of the junction block 202, adjacent one side of the first cantilever beam 234. The second cantilever beam 238 also extends forwardly of the forwardmost edge of the first cantilever beam 234. As will be apparent from subsequent description herein, the second cantilever beam 238 operates so as to minimize any lateral movement of the junction block 202 when assembled into a raceway area.

Of significant importance in accordance with the invention, extending forward from a forwardmost edge of the first cantilever beam 234 is a ledge section 240. The ledge section 240 is particularly shown in FIG. 13. As illustrated therein, the ledge section 240 comprises two ledges of differing heights, namely an upper ledge 242 and a lower ledge 244. The upper ledge 242 is integral with and extends forward and downward from the forwardmost edge of the first cantilever beam 234. The lower ledge 244 extends forward and downwardly from the forwardmost portion of the upper ledge 242. The ledges function so as to releasably secure the junction block 202 within raceway areas of differing widths.

Turning again first to FIGS. 7 and 8, and as previously described herein, the junction block 202 and latching device 200 are adapted for use with a supporting bracket 204. The supporting bracket 204 is primarily illustrated in FIGS. 7-10 and 17, 18 and 19. With reference first to FIG. 7, the supporting bracket 204 includes an upper structural member 250 having a planar configuration as shown in FIG. 7. A pair of apertures or through holes 252 extend vertically through the upper member 250. The apertures 250 are adapted to receive connecting means, such as the connecting screws 260 illustrated in FIGS. 17, 18 and 19 (in fact, each of FIGS. 17, 18 and 19 illustrate only one of the pair of connecting screws 260 which would be utilized). The apertures 252 and connecting screws 260 would be utilized to secure the supporting bracket 204 to structural members of a wall panel raceway or the like.

The supporting bracket 250 also includes a downwardly extending flange 254. The downwardly extending flange 254 is preferably integral with the upper member 250 and is molded or otherwise forged during manufacture of the entirety of the supporting bracket 204. The downwardly extending flange 254 has a substantially rectangular configuration and is formed so as to extend in a vertical direction. As described in subsequent paragraphs herein, the downwardly extending flange 254 is utilized to releasably secure the junction block 202 to the supporting bracket 204 through engagement of the flange 254 with the latching device 200.

Extending outwardly from two opposing sides of the upper member 250 are a pair of side arms 256. The side arms 256 are preferably integral with the upper member 250 and extend downwardly from the horizontal plane of the upper member 250. Integral with each of the side arms 256, and extending horizontally from the lower edge therefrom are a set of mounting brackets 258. A pair of mounting brackets 258, each having an opposing configuration with the other, are formed on the lower edge of each of the side arms 256.

Assembly of the supporting bracket 204 to the junction block 202 through the latching device 200 will now be described, primarily with respect to FIGS. 7, 8, 17, 18 and 19. With reference thereto, the junction block 202 would first be positioned relative to the supporting bracket 204 as shown in FIG. 7. It is assumed that the supporting bracket 204 would be secured (through connecting screws 260 and apertures 252) to structural members (not shown) of a raceway area associated with the wall panel or the like. FIG. 17 illustrates the relationship between the junction block 202 and the supporting bracket 204 as the supporting bracket 204 is moved into engagement with the block 202. During this movement, two of the opposing mounting brackets 258 on each lateral side of the supporting bracket 204 will move into engagement with the L-shaped mounting lugs 222 positioned on the upper surface of the upper wall 212 of the block 202. Such an engagement is illustrated in FIG. 8.

As the junction block 202 moves into engagement with the supporting bracket 204, the downwardly extending flange 254 will move into an abutment with the first cantilever beam 234. This abutment will cause the first cantilever beam 234 to partially deflect downwardly, through its interconnection with the hinge 232. However, as shown in FIG. 18, as the junction block 202 is moved further into engagement with the supporting bracket 204, the lower portion of the downwardly extending flange 254 will be moved into a position where it is directly above the upper ledge 242 of the ledge section 240. This configuration is expressly illustrated in FIG. 18. With this engagement, the first cantilever beam will flex somewhat upwardly so that the downwardly extending flange 254 is somewhat "locked" into engagement with the upper ledge 242. This configuration is referred to as being "partially" locked in that, as viewed in FIG. 18, the engagement between the downwardly extending flange 254 and the upper ledge 242 will prevent the junction block 202 from being pulled to the right relative to the supporting bracket 204, as viewed in FIG. 18.

Correspondingly, and as primarily shown in FIGS. 7 and 8, the downwardly extending flange 254 is formed so as to provide for a pair of opposing openings 264. These openings are equally spaced apart from the center of the downwardly extending flange 254. When the junction block 202 is engaged with the supporting bracket 204 as illustrated in FIG. 18, the second cantilever beam 238 has flexed upwardly such that it is captured in one of the openings 264. This capture of the second cantilever beam 238 within one of the openings 264 prevents lateral movement of the junction block 202 relative to the supporting bracket 204. If it is desired to remove the junction block 202 from its engagement with the supporting bracket 204, forces can be exerted on the upper portion of the second cantilever beam 238 or on the upper surface of the lower ledge 244 (either manually, by use of a screwdriver, etc.) so as to push downwardly on the latching device 200. The latching device 200 will then, because of its resilient interconnection with the hinge 232, flex downwardly so as to disengage the lower edge of the downwardly extending flange 254 from the upper ledge 242. With this disengagement, the junction block 202 is free to be pulled outwardly (to the right as viewed in FIG. 18) relative to the supporting bracket 204. This engagement of the downwardly extending flange 254 with the upper ledge 242 would be utilized for a particular width raceway in which the junction block 202 is to be used.

As earlier described, an advantage of the latching device 200 in accordance with the invention is that it can accommodate a standard size junction block 202 with varying widths of raceway areas or the like. Previously described herein was the configuration shown in FIG. 18, where the downwardly extending flange 254 of the supporting bracket 204 engages the upper ledge 242 of the latching device 200. If the raceway area is somewhat narrower, it may be advantageous to move the junction block 202 more inwardly toward the inner area of a raceway area. With respect to the views shown in FIG. 18, this would mean moving the junction block 202 more to the left, relative to the supporting bracket 204. The latching device 200 permits this, and such movement will result in the configuration shown in FIG. 19. In this configuration, the junction block 202 has been moved sufficiently so that the downwardly extending flange 254 is directly over the lower ledge 244. With this configuration, the latching device 200 will flex upwardly until the lower ledge 244 engages the lower edge of the downwardly extending flange 254. This configuration is illustrated in FIG. 19. For purposes of preventing the junction block 202 from being moved too far inwardly, the junction block 202 includes a pair of stops 262 mounted on the upper surface of the upper wall 212. When the downwardly extending flange 254 is engaged with the lower ledge 244, the mounting brackets 258 extending through the L-shaped mounting lugs 222 are essentially adjacent the stops 262. Therefore, any attempt to move the junction block 202 farther to the left (as viewed in FIG. 19), relative to the supporting bracket 204, would be prevented by the abutment of the stops 262 with the mounting brackets 258 extending through the L-shaped mounting lugs 222. In accordance with the foregoing, with the downwardly extending flange 254 engaging the lower ledge 244, again the junction block 202 is prevented from being pulled outwardly (to the right as viewed in FIG. 19) relative to the supporting bracket 204. To release the junction block 202 from the supporting bracket 204, forces (either manually, with a screwdriver or the like) would be needed to be exerted onto latching device 200, so as to cause the first cantilever beam 234 and second cantilever beam 238 to flex downwardly, thereby releasing the downwardly extending flange 254 from engagement with the lower ledge 244. With this release of engagement, the junction block 202 is free to be moved outwardly (to the right as viewed in FIG. 19) relative to the supporting bracket 204.

As described in the foregoing paragraphs, the latching device 200 provides for the capability of the junction block 202 to be utilized with raceway areas of differing widths. In addition, it should be noted that the configuration of the latching device 200 permits the junction block 202 to be removed from the supporting bracket 204 through manual activities occurring on the same side of the supporting bracket from which the junction block 202 was received with the supporting bracket 204. That is, unlike certain prior art arrangements, it is unnecessary for an installer to manually exert forces (including forces exerted with a screwdriver or the like) on the junction block 202 or latching device 200 from a side of the raceway area or wall panel opposing the side from which the junction block 202 was inserted. Accordingly, to install and to remove the junction block 202 from the supporting bracket 204, all activities can occur from a single side of the supporting bracket 204. This is particularly useful in situations where the wall panel or raceway area to which the junction block 202 is being installed in relatively cramped or tight spatial areas.

Figure 9:
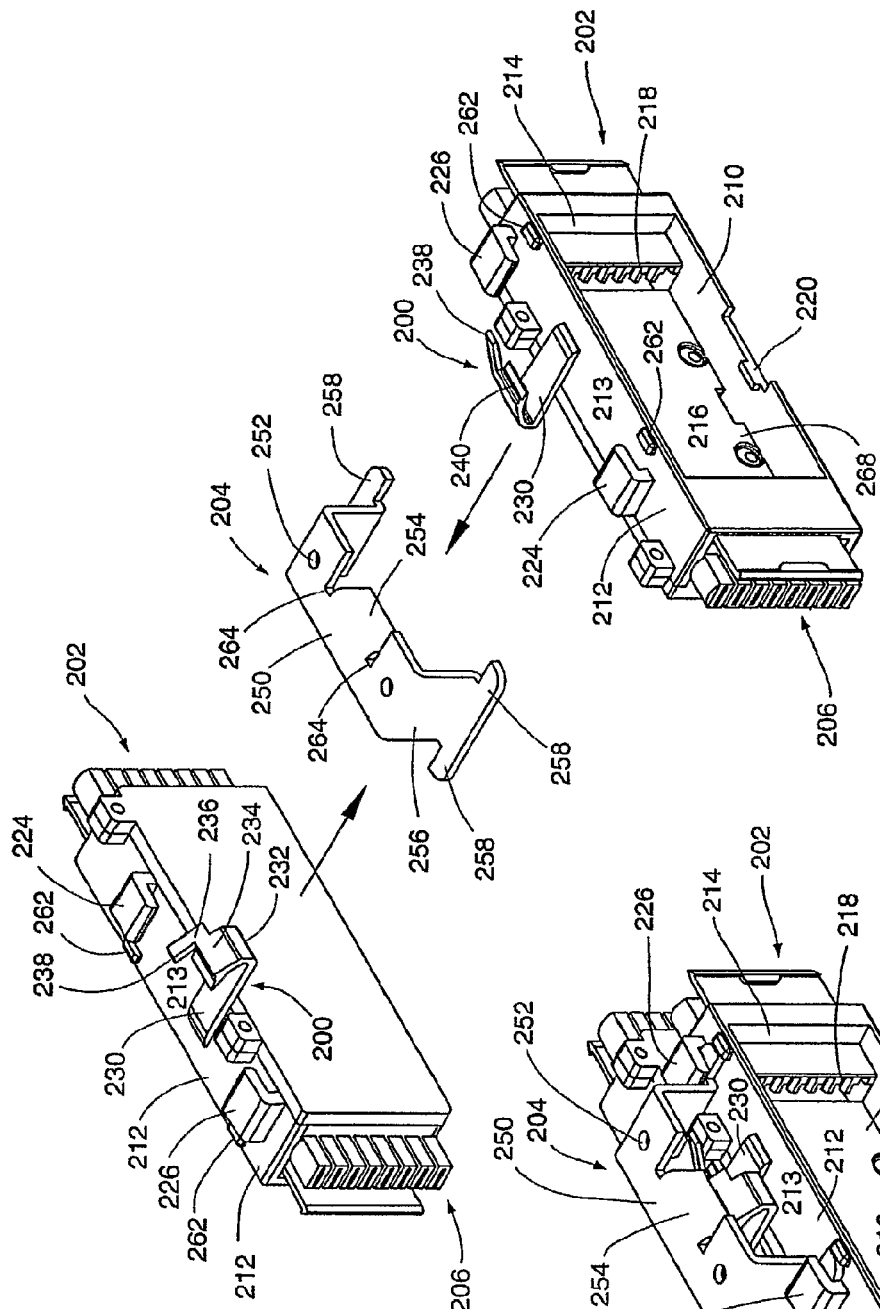
FIG. 9 is an exploded view of two of the junction blocks shown in FIG. 6, with the supporting bracket shown in FIG. 7, and showing the relative positioning for assembly.
Figure 10:
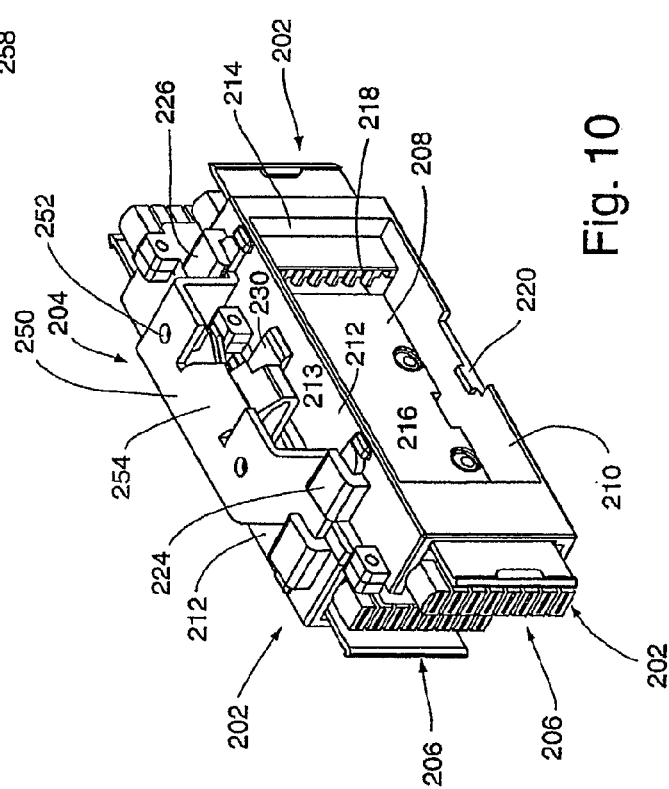
FIG. 10 is a perspective view of the two junction blocks and supporting bracket shown in FIG. 9, in a fully assembled state.

The foregoing has described a configuration utilizing a single junction block 202 with the supporting bracket 204. It is also possible to utilize the latching device 200 with a supporting bracket 204 and a pair of junction blocks 202. Such a configuration is illustrated in FIGS. 9 and 10. As shown therein, a pair of identical junction blocks 202 are provided on opposing sides of a supporting bracket 204. The junction blocks 202 illustrated in FIGS. 9 and 10 have the same, identical configuration as the junction block 202 previously described with respect to FIG. 6. Correspondingly, the supporting bracket 204 shown in FIGS. 9 and 10 corresponds to the supporting bracket 204 shown in FIGS. 7 and 8. With the configuration shown in FIGS. 9 and 10, each of the junction blocks 202 can be moved into engagement with the supporting bracket 204 from opposing sides thereof. In this configuration, the latching device 200 associated with each of the junction blocks 202 would engage the downwardly extending flange 254 in the same manner as previously described with respect to FIGS. 17, 18 and 19. That is, each of the latching devices 200 includes an upper ledge 242 and a lower ledge 244. One of these ledges associated with each of the junction blocks 202 would engage the lower edge of the downwardly extending flange 254, also in the same manner as previously described herein with respect to the single junction block 202. In this case, however, the second cantilever beam 238 of one of the latching devices 200 would be captured within one of the openings 264 of the supporting bracket 204, while the second cantilever beam 238 of the other latching device 200 on the other junction block 202 would be captured in the opposing opening 264 of the supporting bracket 204. This fully assembled configuration is illustrated in FIG. 10. Still further, as previously stated herein, the junction blocks 202 shown in FIGS. 9 and 10 have their L-shaped mounting lugs 222 offset from the center of the junction blocks 202. With this offset, the junction blocks 202 themselves within a raceway area or the like are also offset, as illustrated in FIG. 10. This offset configuration may be desired in certain instances.

It will be apparent to those skilled in the pertinent arts that other embodiments of releasable latch assemblies in accordance with the invention can be designed. That is, the principles of latching devices and assemblies in accordance with the invention are not limited to the specific embodiments described herein. Accordingly, it will be apparent to those skilled in the arts that modifications and other variations of the above-described illustrative embodiments of the invention may be effected without departing from the spirit and scope of the novel concepts of the invention.

The embodiments of the invention in which an exclusive property or privilege is claimed are defined as follows:

1. A releasable latching mechanism adapted for use with an electrical junction block for supplying power to at least one outlet receptacle, from incoming power transmitted through said junction block to said outlet receptacle, said latching mechanism adapted to releasably support said junction block on a supporting bracket, said latching mechanism comprising:
   support means for securing said latching mechanism to said junction block;
   a ledge structure coupled to said support means and comprising at least first and second ledges;
   said supporting bracket releasably engages said first ledge when said junction block is in a first position relative to said supporting bracket;
   said supporting bracket releasably engages said second ledge when said junction block is in a second position relative to said supporting bracket; and
   when said supporting bracket releasably engages either said first ledge or said second ledge, said junction block is prevented from being moved in a first direction away from said supporting bracket in the absence of manipulation of said latching mechanism.

2. A releasable latching mechanism in accordance with claim 1, characterized in that said latching mechanism is sized and configured so that manual forces exerted on said latching mechanism from the same side of said supporting bracket from which said junction block has been moved so as to engage said supporting bracket will cause said latching mechanism to be manipulated so that said junction block may be moved in said first direction away from said supporting bracket, in the absence of requiring any manual forces to be exerted on said junction block or said latching mechanism from an opposing side of said supporting bracket.

3. A releasable latching mechanism is accordance with claim 1, characterized in that said latching mechanism further comprises resilient means coupled to said support means and to said ledge structure for permitting, in response to manual manipulation, said ledge structure to flex so as to allow said first ledge to be disengaged from said supporting bracket, and to further allow said junction block to then be pulled away from said supporting bracket.

4. A releasable latching mechanism is accordance with claim 1, characterized in that said latching mechanism further comprises resilient means coupled to said support means and to said ledge structure for permitting, in response to manual manipulation, said ledge structure to deflect so as to allow said second ledge to be disengaged from said supporting bracket, and to further allow said junction block to then be pulled away from said supporting bracket.

5. A releasable latching mechanism in accordance with claim 1, characterized in that said latching mechanism further comprises means for preventing any substantial lateral movement of said junction block relative to said supporting bracket, when said supporting bracket is releasably engaged with said first ledge or said second ledge.

6. A releasable latching mechanism in accordance with claim 1, characterized in that said latching mechanism further comprises:
   resilient means coupled to said support means and to said ledge structure for permitting, in response to manual manipulation, said ledge structure to deflect so as to allow said first ledge to be disengaged from said support means, and to further allow said junction block to then be pulled away from said supporting bracket; and
   a second cantilever beam coupled to said resilient means for preventing any substantial lateral movement of said junction block relative to said supporting bracket, when said supporting bracket is engaged with either said first ledge or said second ledge.

7. A releasable latching mechanism in accordance with claim 1, characterized in that:
   said junction block comprises an upper surface of an upper wall; and
   said support means comprises a horizontally positioned member rigidly secured to said upper surface of said upper wall.

8. A releasable latching mechanism in accordance with claim 1, characterized in that said junction block further comprises:

an upper wall having an upper surface; and
a pair of mounting lugs secured to said upper surface of said upper wall of said junction block.

9. A releasable latching mechanism in accordance with claim 1, characterized in that:
said supporting bracket comprises a downwardly extending flange; and
said supporting bracket releasably engages said first ledge when said downwardly extending flange is releasably engaged with said first ledge.

10. A releasable latching mechanism in accordance with claim 1, characterized in that:
said supporting bracket comprises a plurality of mounting brackets;
said junction block comprises an upper wall having an upper surface, and a pair of mounting lugs mounted on said upper surface; and
when said supporting bracket is releasably engaged with either said first ledge or said second ledge, each one of a pair of said mounting brackets is releasably received within a corresponding one of said mounting lugs.

11. A releasable latching mechanism in accordance with claim 1, characterized in that said latching mechanism further comprises:
a living hinge having resilent properties and coupled to said support means; and
a first cantilever beam having one end coupled to said hinge means and said opposing end coupled to said ledge structure.

12. A releaseable latching mechanism in accordance with claim 1, characterized in that said junction block includes stop means for preventing said junction block from being moved too far when engaging said junction block with said supporting bracket.

13. A releasable latching mechanism in accordance with claim 3, characterized in that said resilient means comprises hinge means having resilient properties and having one edge coupled to said support means.

14. A releasable latching mechanism in accordance with claim 13, characterized in that said resilient means further comprises a first cantilever beam having one end coupled to said hinge means, and said other end coupled to said ledge structure.

15. A releasable latching mechanism in accordance with claim 5, characterized in that said means for preventing any substantial lateral movement of said junction block relative to said supporting bracket comprises a second cantilever beam coupled to said support means, and adapted to flex upwardly and downwardly relative to said junction block.

16. A releasable latching mechanism in accordance with claim 8, characterized in that said support means is positioned on said upper surface of said upper wall, between said mounting lugs, and said support means is further positioned nearer one of said mounting lugs relative to the other of said mounting lugs.

17. A releasable latching mechanism in accordance with claim 9, characterized in that said supporting bracket releasably engages said second ledge when said downwardly extending flange is releasably engaged with said second ledge.

18. A releaseable latching mechanism in accordance with claim 11, characterized in that said latching mechanism further comprises a second cantilever beam coupled to said first cantilever beam and positioned to the side thereof, and with said second cantilever beam extending in substantially the same plane as said first cantilever beam.

19. A releasable latching mechanism in accordance with claim 18, characterized in that said supporting bracket comprises:
a downwardly extending flange; and
a pair of openings formed on each side of said downwardly extending flange.

20. A releasable latching mechanism in accordance with claim 19, characterized in that said supporting bracket and said second cantilever beam are relatively sized and configured so that when said downwardly extending flange engages either said first ledge or said second ledge, said second cantilever beam extends into one of said openings of said supporting bracket.

21. A junction block and latching mechanism assembly adapted for use in supplying power to an outlet receptacle, from incoming power transmitted through at least one junction block to said outlet receptacle, said assembly adapted to releasably support a pair of opposing junction blocks on a supporting bracket, said assembly comprising:
a pair of junction blocks;
a pair of releasable latching mechanisms, each or said releasable latching mechanisms being coupled to a different one of said pair of junction blocks;
a supporting bracket adapted to releasably support both of said junction blocks;
each of said releasable latching mechanisms having a ledge structure comprising at least first and second ledges;
said supporting bracket releasably engages said first ledge or said second ledge of both of said junction blocks, when each of said junction blocks is in a first position or a second position, respectively, relative to said supporting bracket; and
when said supporting bracket releasably engages either said first ledge or said second ledge of each of said junction blocks, said junction blocks are prevented, in the absence of manual manipulation of said latching mechanisms, from being moved outwardly away from said supporting bracket.

22. An assembly in accordance with claim 21, characterized in that each of said releasable latching mechanisms comprises:
support means for securing said latching mechanisms to a corresponding one of said junction blocks;
hinge means having resilient properties and coupled to said support means; and
a first cantilever beam having one end coupled to said hinge means and an opposing end coupled to said ledge structure.

23. An assembly in accordance with claim 12, characterized in that said latching mechanisms and said supporting bracket are sized and configured so that said pair of said junction blocks can be supported on said supporting bracket in a back to back relationship, without requiring more than one supporting bracket.

24. An assembly in accordance with claim 23, characterized in that said junction blocks are supported on said supporting bracket in said back to back relationship, with one of said junction blocks being offset relative to the other of said junction blocks.

* * * * *

UNITED STATES PATENT AND TRADEMARK OFFICE
CERTIFICATE OF CORRECTION

PATENT NO. : 7,341,480 B2  Page 1 of 1
APPLICATION NO. : 11/597370
DATED : March 11, 2008
INVENTOR(S) : Norman R. Byrne It is certified that error appears in the above-identified patent and that said Letters Patent is hereby corrected as shown below:

Column 16, line 23, "or" should be --of--.

Signed and Sealed this

Twenty-third Day of December, 2008

JON W. DUDAS
*Director of the United States Patent and Trademark Office*